(12) United States Patent
Yang

(10) Patent No.: US 12,217,458 B1
(45) Date of Patent: Feb. 4, 2025

(54) CAMERA EXTRINSIC PARAMETER CALIBRATION METHOD, IMAGE STITCHING METHOD AND APPARATUS THEREOF

(71) Applicant: TP-LINK CORPORATION PTE. LTD., Singapore (SG)

(72) Inventor: Haoran Yang, Chengdu (CN)

(73) Assignee: TP-LINK CORPORATION PTE. LTD., Singapore (SG)

( * ) Notice: Subject to any disclaimer, the term of this patent is extended or adjusted under 35 U.S.C. 154(b) by 0 days.

(21) Appl. No.: 18/410,683

(22) Filed: Jan. 11, 2024

Related U.S. Application Data

(63) Continuation of application No. 18/241,377, filed on Sep. 1, 2023, now abandoned.

(51) Int. Cl.
*G06T 7/80* (2017.01)
*H04N 5/262* (2006.01)

(52) U.S. Cl.
CPC ............ *G06T 7/80* (2017.01); *H04N 5/2624* (2013.01); *G06T 2207/20212* (2013.01); *G06T 2207/30244* (2013.01)

(58) Field of Classification Search
None
See application file for complete search history.

(56) References Cited

U.S. PATENT DOCUMENTS

| 10,339,390 | B2 * | 7/2019 | Shen | G01B 11/002 |
| 11,921,824 | B1 * | 3/2024 | Hester | G06N 3/045 |
| 2015/0379766 | A1 | 12/2015 | Newman | |
| 2019/0058870 | A1 * | 2/2019 | Rowell | H04N 13/189 |
| 2019/0132576 | A1 * | 5/2019 | Zhang | H04N 23/90 |

(Continued)

FOREIGN PATENT DOCUMENTS

| CN | 110349219 A | 10/2019 |
| CN | 112308930 A | 2/2021 |

(Continued)

OTHER PUBLICATIONS

Gu et al., "Calibration of stereo rigs based on the backward projection process," Meas. Sci. Technol. 27 (2016) 085007 (11pp) (Year: 2016).*

(Continued)

*Primary Examiner* — Soo Shin
(74) *Attorney, Agent, or Firm* — Loeb & Loeb LLP

(57) ABSTRACT

The invention provides a camera extrinsic parameter calibration method, an image stitching method and an apparatus thereof. The calibration method can include: acquiring a plurality of images captured by the camera based on a plurality of sets of extrinsic parameters to be calibrated, wherein each of the plurality of sets of extrinsic parameters to be calibrated include a horizontal rotation angle and a vertical rotation angle; obtaining at least one matched image pair based on feature point matching among the plurality of images, wherein each matched image pair includes matched feature point pairs with a quantity satisfying a threshold condition; and calibrating the plurality of sets of extrinsic parameters to be calibrated according to a first difference representation between coordinate representations of each matched feature point pair of each matched image pair in a reference coordinate system.

18 Claims, 5 Drawing Sheets

(56) References Cited

U.S. PATENT DOCUMENTS

| | | | |
|---|---|---|---|
| 2019/0158813 A1* | 5/2019 | Rowell | ............... H04N 13/111 |
| 2019/0325580 A1 | 10/2019 | Lukac | |
| 2020/0106960 A1* | 4/2020 | Aguilar | ............... H04N 17/002 |
| 2022/0030212 A1 | 1/2022 | Aggarwal | |

FOREIGN PATENT DOCUMENTS

| | | |
|---|---|---|
| CN | 112819904 A | 5/2021 |
| CN | 115631244 A | 1/2023 |
| CN | 115984099 A | 4/2023 |

OTHER PUBLICATIONS

Gu et al., "Camera calibration based on the back projection process," Meas. Sci. Technol. 26 (2015) 125004 (10pp) (Year: 2015).*

Majumdar, Jharna, Shilpa Ankalaki, and Sarala Madolli. "Adaptive Calibration for Camera and Stitching of Images." Emerging Research in Computing, Information, Communication and Applications: ERCICA 2020, vol. 2. Springer Singapore, 2022.

Brown, Matthew, and David G. Lowe. "Automatic panoramic image stitching using invariant features." International journal of computer vision 74 (2007): 59-73.

International Search Report and Written Opinion issued in App. No. PCT/US24/44929, dated Nov. 15, 2024, 12 pages.

\* cited by examiner

CAMERA EXTRINSIC PARAMETER CALIBRATION METHOD, IMAGE STITCHING METHOD AND APPARATUS THEREOF

CROSS-REFERENCE TO RELATED APPLICATIONS

This application is a continuation of U.S. patent application Ser. No. 18/241,377, filed on Sep. 1, 2023 and entitled "CAMERA EXTRINSIC PARAMETER CALIBRATION METHOD, IMAGE STITCHING METHOD AND APPARATUS THEREOF". The entire disclosure of the aforementioned application is incorporated by reference as part of the disclosure of this application.

TECHNICAL FIELD

The invention relates to the technical field of image processing, in particular to a method and an apparatus for calibrating extrinsic parameters of a camera, a method and an apparatus for image stitching, an electronic device and a medium.

BACKGROUND

In a system including one or more cameras, such as car-mounted panoramic view, panorama camera, multi-view imaging system, etc., it is necessary to accurately know the intrinsic parameters and extrinsic parameters of the one or more cameras, so that images captured by these cameras may be stitched into a panoramic view.

The intrinsic parameters of a camera are parameters related to the camera's own characteristics, such as the focal length and pixel size of the camera, which are generally relatively accurate. The extrinsic parameters of the camera are the parameters of the camera in the world coordinate system, such as the position and rotation direction of the camera, which can be expressed by Euler angles ($\varphi$, $\theta$, $\psi$) (in which: $\varphi$: roll angle, $\theta$: yaw angle, $\psi$: pitch angle). The extrinsic parameters of the camera change with the change of the pose of the camera, so the extrinsic parameters and pose of the camera can be used interchangeably in present application.

The camera will record current pose when capturing an image. However, in present application scenario that requires high accuracy, such as present application scenario of panoramic image stitching, the recorded pose may have a large error, which may affect the effect of the stitched panoramic image. Therefore, the recorded pose cannot be directly used for image stitching, so a solution for calibrating the extrinsic parameters of the camera is needed.

SUMMARY

According to an aspect of present application, a method for calibrating extrinsic parameters of a camera is provided. The method may comprises: acquiring a plurality of images captured by the camera based on a plurality of sets of extrinsic parameters to be calibrated, wherein each of the plurality of sets of extrinsic parameters to be calibrated include a horizontal rotation angle and a vertical rotation angle; obtaining at least one matched image pair based on feature point matching among the plurality of images, wherein each matched image pair comprises matched feature point pairs with a quantity satisfying a threshold condition; and calibrating the plurality of sets of extrinsic parameters to be calibrated according to a first difference representation between coordinate representations of each matched feature point pair of each matched image pair in a reference coordinate system.

According to another aspect of present application, an image stitching method is provided. The method may comprises: acquiring a plurality of images captured by a camera based on a plurality of sets of extrinsic parameters, wherein each of the plurality of sets of extrinsic parameters include a horizontal rotation angle and a vertical rotation angle; calibrating the plurality of sets of extrinsic parameters by using the above method for calibrating the extrinsic parameters of the camera, to obtain a plurality of sets of calibrated extrinsic parameters; and stitching the plurality of images based on the plurality of sets of calibrated extrinsic parameters.

According to another aspect of present application, an apparatus for calibrating extrinsic parameters of a camera is provided. The apparatus comprises: an acquisition module for acquiring a plurality of images captured by the camera based on a plurality of sets of extrinsic parameters to be calibrated, wherein each of the plurality of sets of extrinsic parameters to be calibrated include a horizontal rotation angle and a vertical rotation angle; a matching module for obtaining at least one matched image pair based on feature point matching among the plurality of images, wherein each matched image pair comprises matched feature point pairs with a quantity satisfying a threshold condition; and a calibration module for calibrating the plurality of sets of extrinsic parameters to be calibrated according to a first difference representation between coordinate representations of each matched feature point pair of each matched image pair in a reference coordinate system.

According to another aspect of present application, an apparatus for calibrating extrinsic parameters of a camera is provided. The apparatus comprises: an acquisition module, for acquiring a plurality of images captured by a camera based on a plurality of sets of extrinsic parameters, wherein each of the plurality of sets of extrinsic parameters include a horizontal rotation angle and a vertical rotation angle; the above apparatus for calibrating the plurality of sets of extrinsic parameters to obtain a plurality of sets of calibrated extrinsic parameters; and an stitching module, for stitching the plurality of images based on the plurality of sets of calibrated extrinsic parameters.

According to another aspect of present application, an electronic device is provided, which comprises: a processor, and a memory having stored there on computer programs which, when executed by the processor, cause the processor to perform the above method.

According to another aspect of present application, a computer-readable storage medium is provided, which has stored thereon computer programs which, when executed by the processor, cause the processor to perform the above method.

BRIEF DESCRIPTION OF THE DRAWINGS

In order to more clearly explain the embodiments of present application or the technical solution in the prior art, the drawings needed to be used in the description of the embodiments of present application or the prior art will be briefly introduced below. Obviously, the drawings in the following description are only some embodiments recorded in present application, and other drawings can be obtained according to these drawings of the embodiments of present application for those skilled in the art.

DETAILED DESCRIPTION

Figure 1:
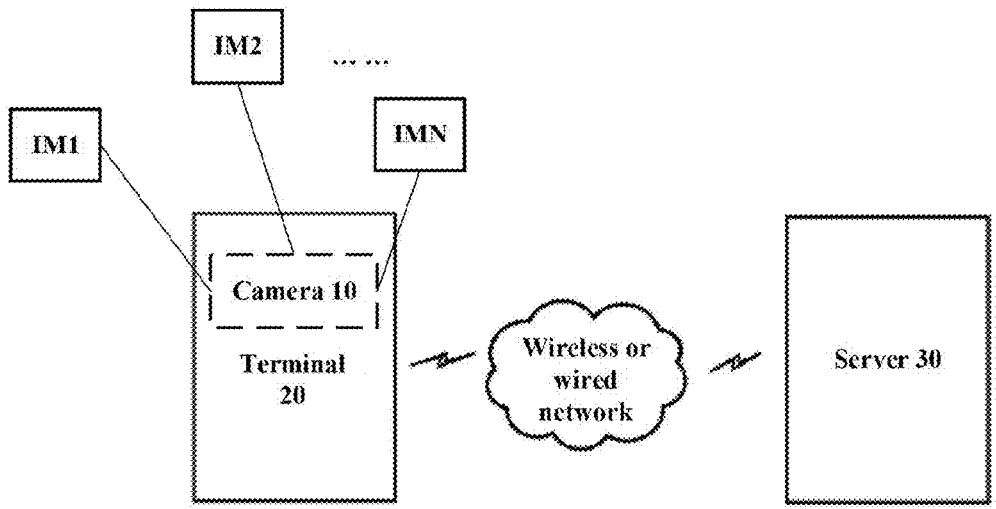
FIG. 1 shows an exemplary application system diagram of a method for calibrating extrinsic parameters of a camera provided by an embodiment of the present application.

In the following, the technical solution in the embodiments of present application will be clearly and completely described with reference to the drawings in the embodiments of present application. Obviously, the described embodiments are only a part of the embodiment of present application, but not all the embodiments. Based on the embodiments in present application, all other embodiments obtained by those skilled in the art without inventive work belong to the protection scope of present application.

Some types of cameras (for example, PTZ cameras, P indicates rotation in the horizontal direction; T indicates the movement in the vertical direction, such as the pitch of the lens; Z indicates zoom) can rotate in the horizontal direction and in the vertical direction when capturing images, so that images can be captured in different poses (corresponding to different sets of extrinsic parameters of the camera) respectively. It is desired that these captured images can be stitched together to get a panoramic image.

In the current panoramic image stitching technology, the complexity of extrinsic parameter calibration is reduced by limiting the camera's motion mode (only horizontal rotation), but based on this technology, it is impossible to deal with the more complicated problem of image stitching when the camera rotates in the horizontal direction (corresponding to angle θ) and in the vertical direction (corresponding to angle ψ), so the method of extrinsic parameter calibration in this panoramic image stitching technology is limited. Even some image stitching techniques do not calibrate the extrinsic parameters of the camera, and only use gray matching to process the image stitching.

That is to say, the current panoramic image stitching technology usually only supports the camera to rotate in the horizontal direction. When the camera rotates in the vertical direction, the current panoramic image stitching technology will not be able to handle it. For example, the panoramic stitching methods used by mobile phones and pan-tilt cameras are all based on stitching multiple images captured when the camera rotates in the horizontal direction to get a panoramic image.

In addition, Simultaneous Localization and Mapping (SLAM) technology also involves the calibration of camera extrinsic parameters. The camera motion faced by SLAM is more complicated than that of PTZ camera, for example, the translational motion of the camera needs to be considered, so there are many variable factors to be considered when modeling the camera in SLAM, which means that the extrinsic parameter calibration method in SLAM is more universal. For the extrinsic parameter calibration problem of PTZ camera, for example, extrinsic parameter calibration algorithm based on SLAM is not simplified enough. In addition, in SLAM, the fast but inaccurate feature point extraction algorithm (e.g., Oriented FAST and Rotated BRIEF, ORB) is usually used because of the high real-time requirement. Because the output of SLAM system only contains many cameras poses and landmark points, the accuracy requirement of camera extrinsic parameter calibration algorithm in SLAM is not as high as that in image stitching.

It can be seen that for the calibration of extrinsic parameters of a camera (such as a PTZ camera) that can rotate in the horizontal and vertical directions to capture images, the extrinsic parameter calibration method in the panoramic image stitching technology aiming at the rotation only in the horizontal direction is too simple at present, while the extrinsic parameter calibration method in SLAM is too complicated.

Therefore, present application proposes a solution that can calibrate the extrinsic parameters of a camera such as a PTZ camera, and the calibration algorithm is relatively simple.

Hereinafter, the solution of the method for calibrating the extrinsic parameters of the camera of the present application will be described in more detail with reference to FIGS. 1-11.

FIG. 1 shows an exemplary application system diagram of a method for calibrating extrinsic parameters of a camera provided by an embodiment of the present application. The camera can rotate in the horizontal direction and in the vertical direction to capture images.

As shown in FIG. 1, the system 100 may include a camera (for example, a PTZ camera) 10, a terminal 20, and a server 30.

The camera 10 may be integrated into the terminal 20, for example, a camera module in a mobile phone. The camera 10 can capture a plurality of images IM1, . . . IMN with different sets of camera extrinsic parameters (corresponding to different poses), N is an integer greater than or equal to 1. Each set of extrinsic parameters includes the rotation angles in the horizontal direction and the vertical direction, which correspond to θ and ψ in Euler angles respectively. The camera 10 can measure and record the current camera extrinsic parameters (pose) while capturing respective images. However, because the errors of the extrinsic parameters measured by the camera are large and inaccurate, if these extrinsic parameters are directly used to stitch images, the dislocation between the images will be obvious, so these extrinsic parameters (which can be called initial extrinsic parameters, initial values of extrinsic parameters, initial values of extrinsic parameters to be calibrated, etc.) are not suitable to be used for stitching image directly. Therefore, the method for calibrating camera extrinsic parameters proposed in the embodiment of present application is needed to obtain as actual and accurate camera extrinsic parameters as possible (also called calibrated extrinsic parameters), so as to use them for image stitching.

After the camera 10 captures images, it transmits the captured images and/or the corresponding recorded initial extrinsic parameters to a processing device of the terminal 20. After receiving the captured images, the processing device of the terminal 20 uses the method for calibrating the camera extrinsic parameters provided by the embodiment of present application to calibrate the camera extrinsic parameters, and then stitches the captured images based on the calibrated extrinsic parameters.

Alternatively, the terminal 20 can also wirelessly or wired transmit the captured images and/or the corresponding recorded initial extrinsic parameters to the server 30 through the network. The server 30 uses the method for calibrating the camera extrinsic parameters provided by the embodiment of the present application to calibrate the camera extrinsic parameters, and then stitches the captured images based on the calibrated extrinsic parameters, and returns the stitched images to the terminal. The server 30 may be a cloud server, a local server, a physical server or a virtual server, which is not limited in present application. Alternatively, in other embodiments, the server and the terminal can jointly use the method for calibrating the camera extrinsic parameters of the provided by the embodiment of present application to calibrate the camera extrinsic parameters.

Figure 2:
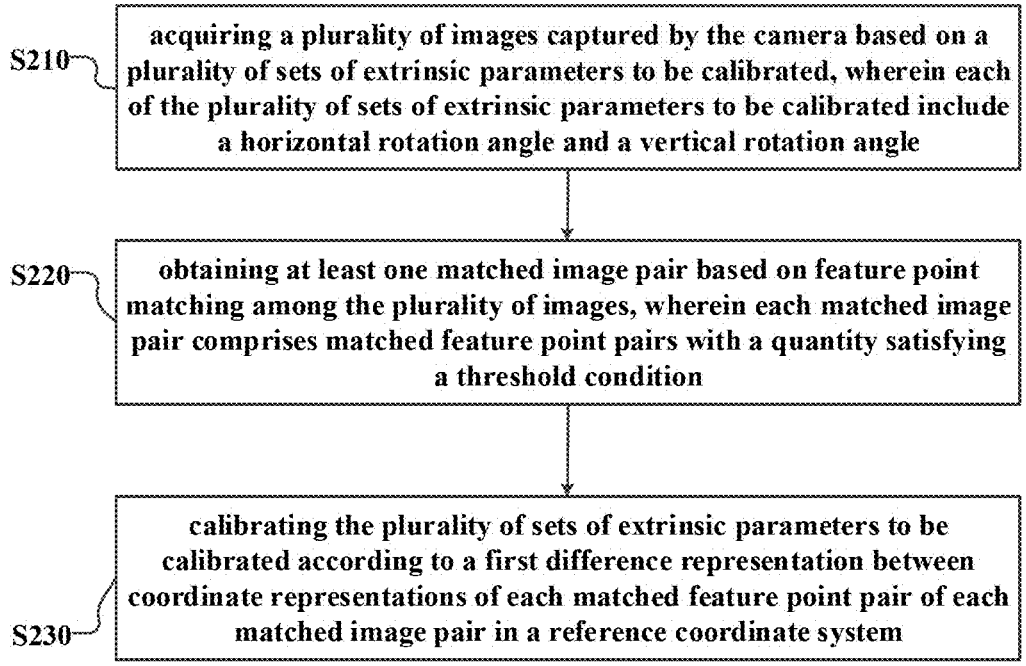
FIG. 2 shows a flowchart of a method for calibrating extrinsic parameters of a camera provided by an embodiment of the present application.

FIG. 2 shows a flowchart of a method for calibrating extrinsic parameters of a camera provided by an embodiment of the present application. The method shown in FIG. 2 can be performed by a server or a terminal or a combination of the two.

As shown in FIG. 2, in step S210, a plurality of images captured by the camera based on a plurality of sets of extrinsic parameters to be calibrated are acquired, wherein each set of the plurality of sets of extrinsic parameters to be calibrated include a horizontal rotation angle and a vertical rotation angle.

As mentioned above, the camera can rotate in the horizontal direction and the vertical direction, and does not translate. The camera captures different images at different horizontal rotation angles and/or vertical rotation angles, and each image corresponds to one set of camera extrinsic parameters (that is, a camera pose), so the horizontal rotation angle ($\theta$)) and vertical rotation angle ($\psi$)) in Euler angle can be used to describe the camera rotation. Accurate camera extrinsic parameters are unknown and need to be calibrated by the method described in the embodiment of present application, so they are called "extrinsic parameters to be calibrated" (also called a plurality of sets of extrinsic parameters). In this application, the calibration process for the plurality of sets of external parameters to be calibrated can also be regarded as the optimization process for the plurality of sets of external parameters to be calibrated, so the expressions of "optimization" and "calibration" can also be used interchangeably.

In step S220, at least one matched image pair is determined based on feature point matching among the plurality of images, wherein each matched image pair includes matched feature point pairs with a quantity satisfying a threshold condition.

For example, since at least two images captured by the camera with different sets of extrinsic parameters may include a same object point in the actual target scenario, then each feature point in the at least two images to which the object point is mapped is regarded as a matched feature point. The correctly matched feature point in any two images is regarded as a matched feature point pair (also referred to as inner point pair).

For example, image 1, image 2 and image 3, which are respectively captured based on three sets of extrinsic parameters, all include the same object point in the actual target scenario. The feature points (pixel points) of this object point in image 1 and image 2 serve as a matched feature point pair, the feature points (pixel points) of this object point in image 1 and image 3 serve as another matched feature point pair, and the feature points (pixel points) of this object point in image 2 and image 3 serve as yet another matched feature point pair.

In present application, feature point extraction algorithms can be used to extract feature points of each image, for example, based on Scale Invariant Feature Transform (SIFT) algorithm, ORB algorithm or Speeded up Robust Features (SURF) algorithm. Then, when determining whether there is a matched feature point pair between the two images of each image pair, the inner points (correctly matched feature points) and outer points (mismatched feature points) of the two images included in the image pair can be filtered out based on the homography matrix or the essential matrix, using the Random Sample Consensus (RANSAC) algorithm (as a part of image matching algorithm). All the algorithms mentioned here are well known in the field, so the specific description thereof is omitted here.

Alternatively, matched image pairs can be filtered out by setting a threshold condition, that is, if the number of matched feature point pairs of two images included in an image pair is small, matching relationship of the image pair has little influence on the subsequent calibration process, so it can be discarded. That is, when the number of matched feature point pairs included in each image pair is large enough (for example, the threshold condition is satisfied), the image pair can be considered as a matched image pair.

For example, feature point matching can be performed for each image pair in the plurality of images, and at least one image pair whose number of matched feature point pairs meets the threshold condition can be determined as the at least one matched image pair. For example, only when the number of matched feature point pairs (inner point pairs) of two images is greater than or equal to the threshold, or the ratio of the number of matched feature point pairs (inner point pairs) to the total number of the matched feature point pairs (inner point pairs) and the mismatched feature point pairs (outer point pairs) is greater than or equal to the ratio threshold, etc., will the two images be regarded as one matched image pair.

Or, similarly, the matching probability of each image pair can also be determined by the formula $ni/(8+0.3n)$, where $ni$ is the number of inner point pairs of the image pair and $n$ is the number of inner point pairs plus the number of outer point pairs of the image pair. When the matching probability of each image pair is large enough (for example, greater than a threshold), it can be considered that the image pair is a matched image pair.

Alternatively, because matched feature point pairs or enough matched feature point pairs generally exist between adjacent images, pairwise adjacent images among the plurality of images can be determined to obtain candidate adjacent image pairs. Feature point matching is performed on each of the candidate adjacent image pairs, and at least one candidate adjacent image pair whose number of matched feature point pairs meets a threshold condition is determined as the at least one matched image pair (real adjacent image pair). Moreover, each image may form one or more adjacent image pairs with one or more other images.

That is to say, if the images are not adjacent, the matched feature point pairs may not be determined, thus reducing the calculation amount and complexity of the subsequent calibration process.

Alternatively, candidate adjacent image pairs in a plurality of images can be determined by the following ways. First of all, the rotation angles between multiple images in the horizontal direction and vertical direction (based on the recorded values of the plurality of sets of extrinsic parameters that may not be accurate) can be used to make a preliminary filtering, in which angle thresholds are used to filter out which two images may be adjacent, thus speeding up the speed of matching process later. For example, for image i and image j, if they may be adjacent, their Euler angles need to satisfy:

$$\theta_i - \theta_j < \theta_{thre} \text{ and } \psi_i - \psi_j < \psi_{thre} \quad (1)$$

where $\theta_{thre}$ and $\psi_{thre}$ are preset angle thresholds, and the selection of thresholds can be related to the HFOV and VFOV of the camera, for example, $$\theta_{thre} = \frac{VFOV}{2}, \psi_{thre} = \frac{HFOV}{2}.$$

In this way, some candidate adjacent image pairs can be preliminarily selected, and then for each candidate adjacent image pair, whether the two images included in the candidate adjacent image pair are really adjacent (whether they are really adjacent image pairs) can be judged according to the number of inner points and outer points. For example, only when the number of matched feature point pairs of two images is greater than or equal to the threshold, or the ratio of the number of matched feature point pairs to the total number of the matched feature point pairs and the mismatched feature point pairs is greater than or equal to the ratio threshold, etc., will the two images be regarded as one matched image pair.

Returning to FIG. 2, in step S230, the plurality of sets of extrinsic parameters to be calibrated are calibrated according to a first difference representation between coordinate representations of each matched feature point pair of each matched image pair in a reference coordinate system.

As mentioned above, the matched image pairs here are image pairs including a sufficient number of matched feature point pairs.

The two feature points (called a first feature point and a second feature point respectively) included in each matched feature point pair may each have a two-dimensional coordinate in the image coordinate system of the image where they are located, which can be expressed as a homogeneous coordinate, and is used to convert to a coordinate in the reference coordinate system based on the intrinsic and extrinsic parameters of the camera.

For example, for the first feature point and the second feature point in each matched feature point pair, the first feature point and the second feature point can be determined according to the coordinate value of the first feature point in a first image, a first extrinsic parameter representation (i.e., a set of extrinsic parameters to be calibrated as an unknown variable) corresponding to the first image, the coordinate value of the second feature point in a second image and a second extrinsic parameter representation (i.e., a set of extrinsic parameters to be calibrated as an unknown variable) corresponding to the second image. Because the first feature point and the second feature point correspond to a same object point in the actual target scenario, the ideal situation is that the coordinate difference between the first coordinate representation and the second coordinate representation is zero. However, considering that each image pair will have a plurality of matched feature point pairs, a plurality of images captured by the camera include a plurality of image pairs, and the feature point extraction algorithm and the image matching algorithm (e.g., RANSAC) may also introduce error, it is necessary to comprehensively calibrate the plurality of sets of extrinsic parameters to be calibrated for the plurality of captured images. For example, a calibration objective function can be determined by summing of each first difference representation between the first coordinate representation and the second coordinate representation corresponding to each matched feature point pair of each matched image pair, and the values of the sets of parameters to be calibrated that minimize the value of the calibration objective function can be calculated as the calibration result.

In some examples, for each matched feature point pair, when the two-dimensional coordinates of the first feature point and the second feature point in their corresponding images are respectively converted into the world coordinate system (as the reference coordinate system), theoretically their coordinates (spatial coordinates) in the world coordinate system should be the same. Alternatively, in some other examples, when the two-dimensional coordinates of the first feature point and the second feature point in their corresponding images are converted into the image coordinate system of another image (which can be one of the two images where the first feature point and the second feature point are located, or other images except the images where the first feature point and the second feature point are located), i.e., when the first feature point or the second feature point is re-projected to the image coordinate system of the other image, theoretically the re-projected coordinates of the first feature point and the second feature point should be the same.

For the first example, for each matched feature point pair of each matched image pair, the first coordinate representation of the first feature point in the reference coordinate system is determined according to the coordinate value of the first feature point in the matched feature point pair in the first image and the first extrinsic parameter representation corresponding to the first image, and the second feature point in the matched feature point pair is determined according to the coordinate value of the second feature point in the second image and the second extrinsic parameter representation corresponding to the second image.

For example, there is $m_{ij}$ matched feature point pairs between the i-th image and the j-th image. For the k-th matched feature point pair, the two-dimensional coordinates of the included first feature point in the i-th image and the included second feature point in the j-th image are $(u_k^i, v_k^i)$ and $(u_k^j, v_k^j)$, respectively, which can be converted into homogeneous coordinates:

$$p_k^{(i)} = \begin{bmatrix} u_k^{(i)} \\ v_k^{(i)} \\ 1 \end{bmatrix}, p_k^{(j)} = \begin{bmatrix} u_k^{(j)} \\ v_k^{(j)} \\ 1 \end{bmatrix} \quad (2)$$

Camera intrinsic parameters K corresponding to the i-th image and the j-th image can be expressed in a matrix as follows (which are the same for all images captured by the camera):

$$K = K_i = K_j = \begin{bmatrix} f_x & 0 & c_x \\ 0 & f_y & c_y \\ 0 & 0 & 1 \end{bmatrix} \quad (3)$$

The $f_x$ and $f_y$ in the above formula is calculated by the hardware parameters of the camera. Assuming that the camera's HFOV is H, VFOV is V, and the resolution of the captured image is w*h, there are:

$$f_x = \frac{w}{2\tan\frac{H}{2}}, f_y = \frac{h}{2\tan\frac{V}{2}}, \quad (4)$$

$$c_x = \frac{w}{2}, c_y = \frac{h}{2} \quad (5)$$

Therefore, the coordinates, in the camera spatial coordinate system, of space points respectively corresponding to the coordinate $(u_k^i, v_k^i)$ of the first feature point in the i-th image and the coordinate $(u_k^j, v_k^j)$ of the second feature point in the j-th image can be expressed as:

$$p_k^{(i)'} = K^{-1} p_k^{(i)}, P_k^{(j)'} = K^{-1} p_k^{(j)} \quad (6)$$

With $(\psi, \theta)$, the rotation matrix for coordinate transformation between two coordinate systems can be calculated. The calculation formula of the rotation matrix is as follows:

$$R_{\theta\psi} = R_\theta R_\psi = \begin{bmatrix} 1 & 0 & 0 \\ 0 & \cos\theta & -\sin\theta \\ 0 & \sin\theta & \cos\theta \end{bmatrix} \quad (7)$$

$$\begin{bmatrix} \cos\psi & 0 & \sin\psi \\ 0 & 1 & 0 \\ -\sin\psi & 0 & \cos\psi \end{bmatrix} = \begin{bmatrix} \cos\psi & 0 & \sin\psi \\ \sin\theta\sin\psi & \cos\theta & -\sin\theta\cos\psi \\ -\cos\theta\sin\psi & \sin\theta & \cos\theta\cos\psi \end{bmatrix}$$

The extrinsic parameters corresponding to the i-th image are expressed as $(\theta_i, \psi_i)$, and the extrinsic parameters corresponding to the j-th image can be expressed as $(\theta_j, \psi_j)$. As mentioned above, the accurate extrinsic parameters are unknown variables, and the first coordinate representation and the second coordinate representation of the two space points in the world coordinate system of the camera can be obtained by formula (8):

$$P_k^{(i)} = R_{\theta_i\psi_i}^{-1} P_k^{(i)'}, P_k^{(j)} = R_{\theta_j\psi_j}^{-1} P_k^{(j)'} \quad (8)$$

In this case, an iterative optimization process is carried out for the plurality sets of extrinsic parameters to be calibrated. In each iteration, based on the current values of plurality of sets of extrinsic parameters to be calibrated, current value of the first difference representation of each matched feature point pair is calculated. For example, starting from the first image (i=1), current values of $m_{12}$ first difference representations of $m_{12}$ matched feature point pairs between the first image and the second image (j=2) are determined. Then, starting from the second image (i=2), then, keeping i=1, current values of $m_{13}$ first difference representations of $m_{13}$ matched feature point pairs between the first image and the third image (j=3) are determined, and so on until j=n. Then, starting from the second image (i=2), current values of $m_{23}$ first difference representations of $m_{23}$ matched feature point pairs between the second image and the third image (j=3) are determined. Then, keeping i=1, current values of $m_{24}$ first difference representations of $m_{24}$ matched feature point pairs between the second image and the fourth image (j=4) are determined, and so on until j=n.

Current values of the first difference representations after i=3 are also calculated similarly. In this way, for each iteration, based on the current values of the plurality of extrinsic parameters to be calibrated, the sum (which can be regarded as the loss value) of the current values of all the first difference representations of all the matching feature point pairs of the plurality of images can be expressed as follows:

$$e = \sum_{i=1}^{n} \sum_{j=i+1}^{n} \sum_{k=1}^{m_{ij}} \left| \text{unit}(P_k^{(i)}) - \text{unit}(P_k^{(j)}) \right| \quad (9)$$

Where, $m_{ij}$ is the number of matched feature point pairs of the i-th image and the j-th image, and n is the total number of the plurality of images captured by the camera. unit( ) function is a normalized function used for calculating the unit vector of the vector:

$$\text{unit}(P) = \frac{P}{|P|} \quad (10)$$

Combined with the above formulas, the e can be further expressed as follows. The e can be regarded as a calibration objective function. The values of plurality of sets of extrinsic parameters $(\theta, \psi)$, such as $(\theta_i, \psi_i)$ and $(\theta_j, \psi_j)$, etc., are adjusted through multiple iterations to minimize the value of the calibration objective function. The values of the plurality of sets of extrinsic parameters obtained in this way can correspond to the optimal poses of the camera.

$$e = \quad (11)$$

$$\sum_{i=1}^{n} \sum_{j=i+1}^{n} \sum_{k=1}^{m_{ij}} \left| \text{unit}\left( R_{\theta_i\psi_i}^{-1} K^{-1} \begin{bmatrix} u_k^{(i)} \\ v_k^{(i)} \\ 1 \end{bmatrix} \right) - \text{unit}\left( R_{\theta_j\psi_j}^{-1} K^{-1} \begin{bmatrix} u_k^{(j)} \\ v_k^{(j)} \\ 1 \end{bmatrix} \right) \right|$$

For example, the Levenberg-Marquardt algorithm (LM algorithm) in nonlinear optimization algorithm can be used to minimize e through iterative optimization process to solve the optimal poses.

$$\underset{\theta_1\psi_1 \ldots \theta_n\psi_n}{\arg\min} \sum_{i=1}^{n} \sum_{j=i+1}^{n} \sum_{k=1}^{m_{ij}} \quad (12)$$

$$\left| \text{unit}\left( R_{\theta_i\psi_i}^{-1} K^{-1} \begin{bmatrix} u_k^{(i)} \\ v_k^{(i)} \\ 1 \end{bmatrix} \right) - \text{unit}\left( R_{\theta_j\psi_j}^{-1} K^{-1} \begin{bmatrix} u_k^{(i)} \\ v_k^{(i)} \\ 1 \end{bmatrix} \right) \right|$$

In addition, other algorithms can be used to minimize e, such as Gauss-Newton algorithm or Newton algorithm.

It should be noted that the formula of the calibration objective function here and in the following is based on taking any two images in the plurality of images (n images) as an image pair, and is modeling according to the first feature point and the second feature point of the matched feature point pair existing in the image pair. Obviously, if there is no matched feature point pair or the quantity of matched feature point pairs does not satisfy the threshold condition in the image pair (i, j), that is, the image pair is not the matched image pair, then $m_{ij}$ is 0, that is, the error calculation for the image pair will not affect the value of the currently accumulated e, and thus will not affect the optimization result of the plurality of sets of extrinsic parameters. In the case that the matched image pairs are only a part of all image pairs as described above, the values of $m_{ij}$ corresponding to unnecessary image pairs (that is, image pairs not belonging to the matched image pairs) can be assigned 0, so that the error calculation value for these unnecessary image pairs is 0, and the value of currently accumulated e will not be affected.

It can be seen that in the first example, the coordinate difference of three-dimensional space coordinates of two feature points of each matched feature point pair in the world coordinate system is calculated for calibrating the plurality of sets of extrinsic parameters, which can be regarded as being realized by using the bundle adjustment method based on ray emission error.

For the second example, the coordinate system (image coordinate system) of one selected image of a plurality of images captured by the camera with different extrinsic parameters is taken as the reference coordinate system, and in the case that corresponding sets of extrinsic parameters are determined, coordinate system conversion can be performed among the plurality of images based on the rotation matrix (as shown in Formula (7)). For each matched feature point pair, according to the coordinate value of the first feature point in the matched feature point pair in the first image, the first extrinsic parameter representation (a set of extrinsic parameters to be calibrated as unknown variables) corresponding to the first image and the extrinsic parameter representation (a set of extrinsic parameters to be calibrated as unknown variables) corresponding to the one selected image, the first feature point is re-projected into the coordinate system of the selected one image to determine the first coordinate representation of the first feature point in the reference coordinate system; according to the coordinate value of the second feature point in the matched feature point pair in the second image, the second extrinsic parameter representation (a set of extrinsic parameters to be calibrated as unknown variables) corresponding to the second image and the extrinsic parameter representation (a set of extrinsic parameters to be calibrated as unknown variables) corresponding to the one selected image, the second feature point is re-projected into the coordinate system of the selected one image to determine the second coordinate representation of the second feature point in the reference coordinate system.

As a special case, for each matched feature point pair, the image coordinate system corresponding to the first image where the first feature point in the matched feature point pair is located can be taken as the reference coordinate system, so that the first coordinate representation of the first feature point in the reference coordinate system can be determined based on the coordinate value of the first feature point in the first image. The second feature point in the matched feature point pair is re-projected into the reference coordinate system according to the coordinate value of the second feature point in the second image, the second extrinsic parameter representation corresponding to the second image and the extrinsic parameter representation corresponding to the first image, so as to determine the second coordinate representation of the second feature point in the reference coordinate system. Alternatively, the image coordinate system of the second image where the second feature point is located can be used as the reference coordinate system, and the re-projection process is similar.

For example, similar to the above, the coordinate values of the first feature point in the i-th image and the second feature point in the j-th image for the k-th matched feature point pair are $(u_k^i, v_k^i)$ and $(u_k^j, v_k^j)$, respectively. Assuming that the image coordinate system of the i-th image is used as the reference coordinate system, the coordinate values of the second feature point can be transformed. For example, the first coordinate representation P1 of the first feature point and the second coordinate representation P2 of the second feature point are:

$$P1 = \begin{bmatrix} u_k^i \\ v_k^i \\ 1 \end{bmatrix}; P2 = \text{regular}\left(KR_{\theta_i\psi_i}R_{\theta_j\psi_j}^{-1}K^{-1}\begin{bmatrix} u_k^j \\ v_k^j \\ 1 \end{bmatrix}\right) \quad (13)$$

K in the above formula is the camera intrinsic parameter matrix, $R_{\theta_i\psi_i}$ is the rotation matrix (unknown matrix variable) corresponding to the extrinsic parameters when capturing the i-th image, and $R_{\theta_i\psi_i}^{-1}$ is the inverse matrix (unknown matrix variable) of the rotation matrix corresponding to the extrinsic parameters when capturing the j-th image. The regular ( ) function is a normalization function, which is used to normalize the third dimension of homogeneous vector to 1, so as to facilitate the calculation of coordinate difference as described later. The specific definition of regular ( ) is as follows:

$$\text{regular}\left(\begin{bmatrix} x \\ y \\ z \end{bmatrix}\right) = \begin{bmatrix} x/z \\ y/z \\ 1 \end{bmatrix}. \quad (14)$$

Similarly, the iterative optimization process is carried out for the plurality of sets of extrinsic parameters to be calibrated. In each iteration, based on the current values of the plurality of sets of extrinsic parameters to be calibrated, the current value (which can be regarded as the loss value) of the first difference representation of each matched feature point pair is calculated, and the sum of all the first difference representations (i.e., the calibration objective function) for all matched feature point pairs of the plurality of images can be expressed as follows:

$$e = \sum_{i=1}^{n}\sum_{j=i+1}^{n}\sum_{k=1}^{m_{ij}}\left\|\begin{bmatrix} u_k^i \\ v_k^i \\ 1 \end{bmatrix} - \text{regular}\left(KR_{\theta_i\psi_i}R_{\theta_j\psi_j}^{-1}K^{-1}\begin{bmatrix} u_k^j \\ v_k^j \\ 1 \end{bmatrix}\right)\right\| \quad (15)$$

Similarly, it is necessary to calculate the plurality of sets of extrinsic parameters $(\theta, \psi)$, such as $(\theta_i, \psi_i)$ and $(\theta_j, \psi_j)$, etc. that minimize the value of e.

For example, LM algorithm can be used to minimize e to solve the optimal poses:

$$\underset{\theta_1\psi_1 \ldots \theta_n\psi_n}{\text{argmin}} \quad (16)$$

$$\left(\sum_{i=1}^{n}\sum_{j=i+1}^{n}\sum_{k=1}^{m_{ij}}\left\|\begin{bmatrix} u_k^i \\ v_k^i \\ 1 \end{bmatrix} - \text{regular}\left(KR_{\theta_i\psi_i}R_{\theta_j\psi_j}^{-1}K^{-1}\begin{bmatrix} u_k^j \\ v_k^j \\ 1 \end{bmatrix}\right)\right\|\right)$$

It can be seen that in the second example, by calculating the difference of the re-projection coordinates of two feature points of each matched feature point pair in an image coordinate system, it can be used to calibrate the plurality of sets of extrinsic parameters, which can be regarded as being realized by using the bundle adjustment method based on re-projection.

By the method for calibrating the plurality of sets of calibrated extrinsic parameters to be calibrated based on the above iterative optimization process, only the rotation angles in the horizontal direction and the rotation angles in the vertical direction in the Euler angles representing the extrinsic parameters are optimized, so that the problem of universal joint deadlock when optimizing three angles in the Euler angles does not occur, the number of optimization parameters is reduced, and the complexity of the optimization problem is reduced.

In the above process of calibrating the plurality of sets of extrinsic parameters to be calibrated, it is necessary to assign zero values to the plurality of sets of extrinsic parameters to be calibrated, and iteratively adjust values of the plurality of sets of extrinsic parameters to be calibrated, so as to minimize the error e of the above formula (11) or (15), that is, as shown in formula (12) or (16). In this case, the recorded values of extrinsic parameters to be calibrated when capturing each image (the accuracy thereof is not high enough) can be used as the initial values for the iterative optimization process instead of the zero values, so that the optimization direction can be constrained and the range of the optimization result can be limited (for example, it should not be too different from the recorded values of the extrinsic parameters), so that a plurality of sets of calibrated (optimized) extrinsic parameters with high accuracy can be output quickly after repeated iterations.

For example, a plurality of sets of extrinsic parameters recorded when the camera captures the plurality of images (initial values (Euler angles) of the plurality of extrinsic parameters to be calibrated) can be obtained, and then a calibration objective function can be determined (e.g., as shown in Formulas (11) and (15)) by summing each first difference representation between each matched feature point pair of each matched image pair in the reference coordinate system. By adjusting on the basis of the initial values of the the plurality of sets of extrinsic parameters to be calibrated, the adjusted values of the plurality of sets of extrinsic parameters to be calibrated that minimize the value of the calibration objective function are taken as a calibration result.

Taking Formula (11) as an example, the initial values are substituted in the first iteration of Formula (11). At this time, the values of the sums of the first differences obtained for the first time (that is, the loss value of the calibration objective function) is:

$$e_0 = \sum_{i=1}^{n} \sum_{j=i+1}^{n} \sum_{k=1}^{m_{ij}} \left| \text{unit}\left( R_{\theta_i'\psi_i'}^{-1} K^{-1} \begin{bmatrix} u_k^i \\ v_k^i \\ 1 \end{bmatrix} \right) - \text{unit}\left( R_{\theta_j'\psi_j'}^{-1} K^{-1} \begin{bmatrix} u_k^j \\ v_k^j \\ 1 \end{bmatrix} \right) \right| \quad (17)$$

In the above formula, $\theta_i'$ and $\psi_i'$ are the extrinsic parameters recorded when the i-th image is captured by the camera, that is, the initial values of the extrinsic parameters to be calibrated or initial pose, so the parameter adjustment or update involved in the subsequent iterative optimization process is also based on $\theta_i'$ and $\psi_i'$. For example, in the second iteration, the initial values of the extrinsic parameters to be calibrated are adjusted, for example, these initial values are adjusted with a certain step, and then the loss value of the second iteration is obtained, so that it can be applied to the corresponding algorithm to determine how to adjust the parameters. The algorithm used in the specific iterative optimization process can be LM algorithm, Gauss-Newton algorithm or Newton algorithm and so on.

On the other hand, when there are some low-texture regions in the target scenario captured by the camera, the number of matched feature point pairs among some image pairs captured by the camera will be less, so that some images may only form matched image pairs with a few images, which makes the constraints between images insufficient. As shown in the previous formulas (2) and (3), the error e is the sum of coordinate differences between matched feature point pairs of matched image pairs, and the optimization result obtained by the iterative optimization process are easily affected by error accumulation. In addition, when there are few matching feature point pairs, there may be matched feature point pairs with a slightly large deviation among the matched feature point pairs selected by the image matching algorithm, so the error of the image matching algorithm will also affect the optimization results.

Figure 3:
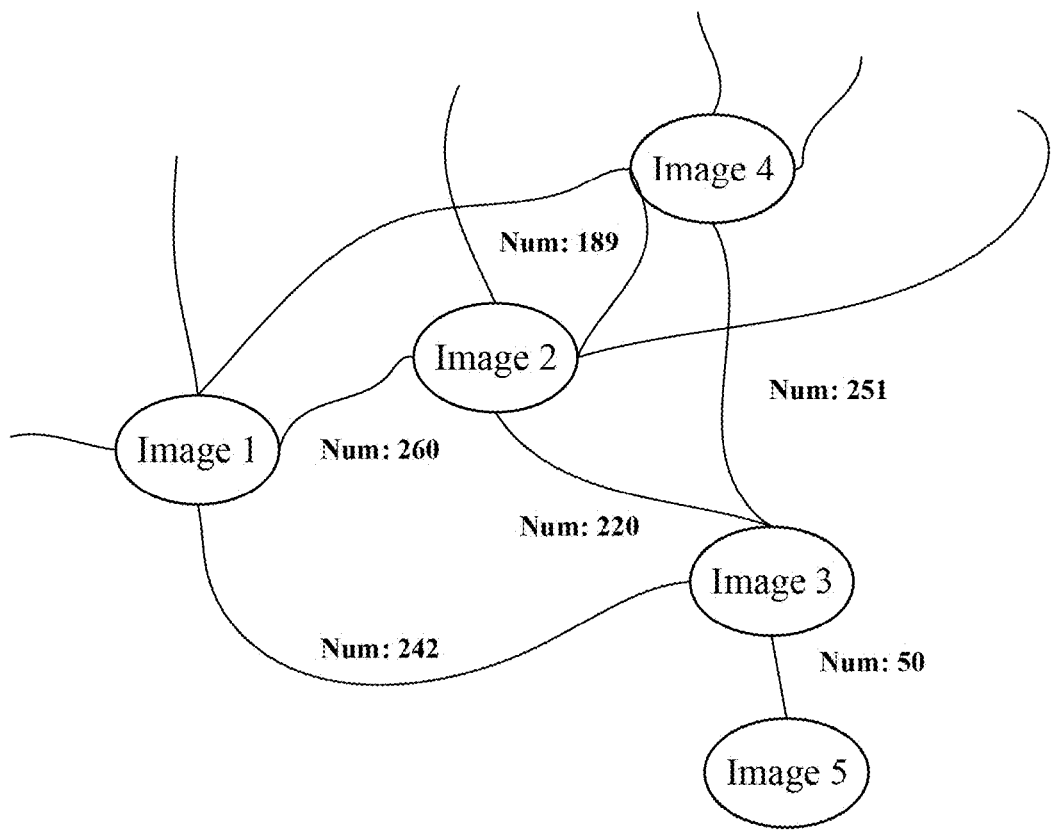
FIG. 3 shows the matching between some of the plurality of images for the target scenario with low-texture region captured by the camera.

FIG. 3 shows the matching between some of the plurality of images for the target scenario with low-texture region captured by the camera.

In FIG. 3, there are multiple matched image pairs between image 1 and image 5. For example, image 1 can form at least two matched image pairs with image 2 and image 3 respectively, and the number of matched feature point pairs is 260 and 242 respectively; image 2 can form at least two matched image pairs with image 3 and image 4 respectively, and the number of matched feature point pairs is 220 and 189 respectively; image 3 can form at least four matched image pairs with image 1, image 2, image 4 and image 5 respectively, and the number of matched feature point pairs with image 4 is 251, and that with image 5 is 50, while image 5 can only form one matched image pair with image 3, and the number of matched feature point pairs is only 50.

As described in the previous iterative optimization process, the plurality of sets of extrinsic parameters to be calibrated are optimized comprehensively by minimizing the value of the calibration objective function (that is, the sum of the first error representations corresponding to all matched feature point pairs), but for example, because of the existence of low-texture regions in the target scenario, image 5 only forms one matched image pair with image 3, and the number of matched feature point pairs is only 50, it is possible that the set of optimized extrinsic parameters corresponding to the image 5 depends heavily on the matched feature point pair with the image 3, and the image 3 also forms matched image pairs with other images, the set of extrinsic parameters to be calibrated corresponding to the image 3 also depend on other images (and other images also depend on yet other images, and so on) in the iterative optimization process, so there is still a problem of error accumulation at the image 3. Meanwhile, the image matching algorithm (e.g., RANSAC) will also introduce matching errors because of the small number of matched feature point pairs between image 5 and image 3. Then the optimization effect for the extrinsic parameters to be calibrated corresponding to image 5 will be poor. Even if the initial values of the plurality of sets of extrinsic parameters to be calibrated are used to improve the optimization effect as described above, the constraints in the iterative optimization process will not be obvious in this case.

Therefore, according to another aspect of the present application, in order to solve the above problem, a further optimization solution is proposed. On the other hand, for an image with a general number of matched images (for example, image 3), there is little difference between the recorded extrinsic parameters and the calibrated extrinsic parameters, i.e., the calibrated extrinsic parameters have a relatively high accuracy relative to the actual extrinsic parameters; but for an image such as image 5, if the regularization term is not added, the calibrated extrinsic parameters are even more inaccurate than the recorded extrinsic parameters, so from this point of view, the regularization term can also be constructed to restrict the calibrated extrinsic parameters of the image such as image 5 based on the difference between the recorded external parameters and the actual external parameters.

In some technologies, the similarity of the sets of extrinsic parameters (pose) corresponding to two images is measured by Lie algebra in the pose diagrams (image I and image J) in the existing SLAM:

$$e_{ij} = \Delta \xi_{ij} \ln(T_{ij}^{-1} T_i^{-1} T_j)^{\vee} \tag{18}$$

The $\xi$ and T in the above formula contain rotation and displacement information. It is inconvenient for the error $e_{ij}$ to be directly brought into the previous formulas (11) and (15), because the weight for the regularization term is inconvenient to set, and it is difficult to unify the error scale and format with the formulas (11) and (15). That is to say, Lie algebras for measuring the similarity in SLAM cannot be directly used to construct the regularization term of present application.

The way to determine the pose similarity in present application will be explained in combination with theoretical knowledge below.

In the extrinsic parameter model of present application, the Euler angles have only two degrees of freedom (corresponding to horizontal rotation and vertical rotation respectively), so the corresponding rotation matrix also has only two degrees of freedom, and thus each set of extrinsic parameters also has only two degrees of freedom because there is no translation. For the mapping function described in the following formula:

$$p = \begin{bmatrix} su \\ sv \\ s \end{bmatrix} = KRP = KR \begin{bmatrix} x \\ y \\ z \end{bmatrix} \tag{19}$$

Because p in the above formula is the pixel coordinate of a pixel point in a image coordinate system, which is a homogeneous coordinate, p has only two degrees of freedom. P is the three-dimensional spatial coordinate of the object point corresponding to the pixel point (in the world coordinate system). If K (intrinsic parameter matrix), p and P are known, two equations can be constructed to solve the rotation matrix R of the extrinsic parameters, and because R has two degrees of freedom, R can be solved uniquely:

$$\begin{bmatrix} su \\ sv \\ s \end{bmatrix} = \begin{bmatrix} f & 0 & c_x \\ 0 & f & c_y \\ 0 & 0 & 1 \end{bmatrix} \begin{bmatrix} \cos\psi & 0 & \sin\psi \\ \sin\theta\sin\psi & \cos\theta & -\sin\theta\cos\psi \\ -\cos\theta\sin\psi & \sin\theta & \cos\theta\cos\psi \end{bmatrix} \begin{bmatrix} x \\ y \\ z \end{bmatrix} \tag{20}$$

When k, p and P are known, the above matrix operation can form three equations, and there are only three unknown variables in the equations: $\theta$, $\psi$, s, and $\theta$, $\psi$ can be solved uniquely. Therefore, if the pixel coordinate of a pixel point and the three-dimensional spatial coordinate of its corresponding object point are known, the set of extrinsic parameters ($\theta$, $\psi$) corresponding to the image where it is located can also be determined. That is to say, if a pair of p and P are determined, R can be determined. When the camera only rotates but does not translate, the camera satisfies a perspective model, so P is also a homogeneous coordinate. Similarly, when K, p and R are determined, a unique P can be solved. Therefore, a same reference pixel point p can be specified for all sets of extrinsic parameters (all poses) of the camera, and the similarity between different sets of extrinsic parameters (different poses) can be measured by the Euclidean distance of three-dimensional coordinates P solved through the above manner. This has the advantages of convenient calculation, and the dimension of the error is the same as that in formulas (11) and (15). Further, because they are all in the reference coordinate system (herein, world coordinate system), so the value of the weight is also of practical significance and convenient to select. Therefore, for two sets of extrinsic parameters (two poses) $R_i$ and $R_j$, the following formula can be used to measure the similarity:

$$Sim(i,j) = |\text{unit}(R_i^{-1} K^{-1} p_c) - \text{unit}(R_j^{-1} K^{-1} p_c)| \tag{21}$$

where $p_c$ is the homogeneous coordinate (known) of the reference pixel point in the image, for example, the middle point $[\text{width}/2, \text{height}/2, 1]^T$ in the image can be selected as the pixel reference point. The practical meaning of the above formula can be understood as the following scenario: the camera captures images in two poses, and the similarity between the two poses is measured by the distance between the object points (unit vector representation of spatial three-dimensional coordinates) corresponding to the reference pixel points in the same position in the image coordinate system of their respective images. The reference pixel point selected in present application is the center point of each image, that is, the practical significance of the regularization term in present application can be understood as: the distance between the spatial three-dimensional coordinates of the object points corresponding to the center pixel points of two images captured by the camera in different poses is used to measure the pose similarity corresponding to these two images. In present application, the schematic diagram of the similarity of posture described in formula (21) is shown in FIG. 4.

Figure 4:
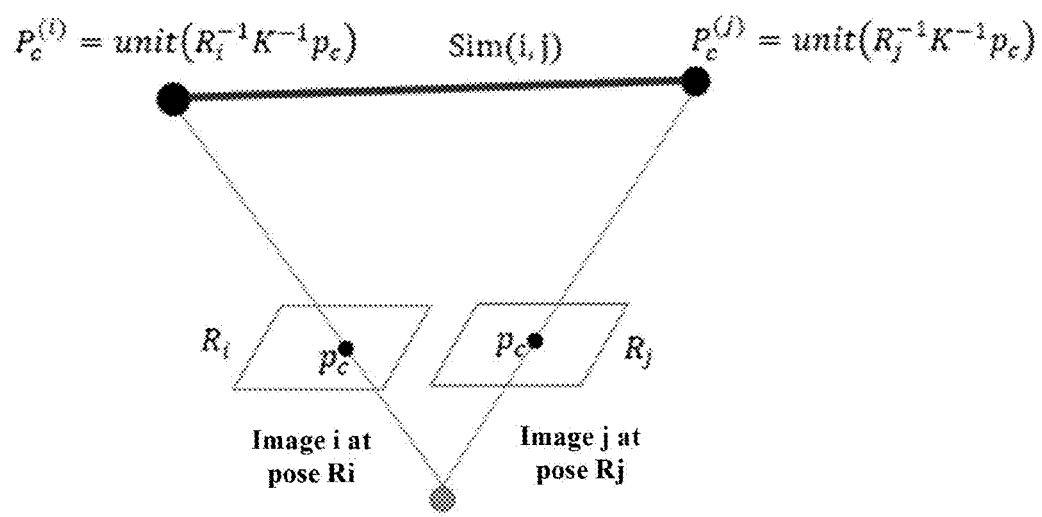
FIG. 4 shows a schematic diagram of the similarity of poses.

In the FIG. 4, image i and image j are two images captured by the camera in two poses, and the length of the top dotted line segment is the value of Sim(i, j), which is the distance between the spatial three-dimensional coordinates of the object points corresponding to the central pixel points of the two images (i and j) captured in different poses, corresponding to the pose similarity between the pose $R_i$ when capturing image i and the pose $R_j$ when capturing image j. At that time when Sim(i, j)=0, it indicates that the pose $R_i$ is the same as the pose $R_j$, and the bigger the Sim(i, j) is, the less similarity between the poses $R_i$ and $R_j$ is, so Sim(i, j) is very suitable for the error penalty item in the optimization process.

Considering the actual situation of present application, since the regularization term can be constructed based on the difference between the recorded extrinsic parameters ($\theta_i'$, $\psi_i'$) and the actual extrinsic parameters ($\theta_i$, $\psi_i$) (that is, the pose similarity between the recorded pose and the actual pose (two poses)), the formula (21) can be modified as follows:

$$\text{Sim}(i, i') = \left| \text{unit}\left(R_{\theta_i \psi_i}^{-1} K^{-1} \begin{bmatrix} u_c \\ v_c \\ 1 \end{bmatrix}\right) - \text{unit}\left(R_{\theta_i' \psi_i'}^{-1} K^{-1} \begin{bmatrix} u_c \\ v_c \\ 1 \end{bmatrix}\right) \right| \quad (22)$$

Similarly, for the case of re-projecting to the image coordinate system of an image, the pose similarity between the recorded pose and the actual pose (two poses) is as follows:

$$\text{Sim}(i, i') = \left\| \begin{bmatrix} u_c \\ v_c \\ 1 \end{bmatrix} - \text{regular}\left(KR_{\theta_i \psi_i} R_{\theta_i' \psi_i'}^{-1} K^{-1} \begin{bmatrix} u_c \\ v_c \\ 1 \end{bmatrix}\right) \right\| \quad (23)$$

Therefore, by the above method, the difference between the recorded extrinsic parameters and the actual extrinsic parameters (that is, the pose similarity between the recorded pose and the actual pose (two poses)) can be obtained, which can be used to construct the regularization item (adjustment item).

Figure 5:
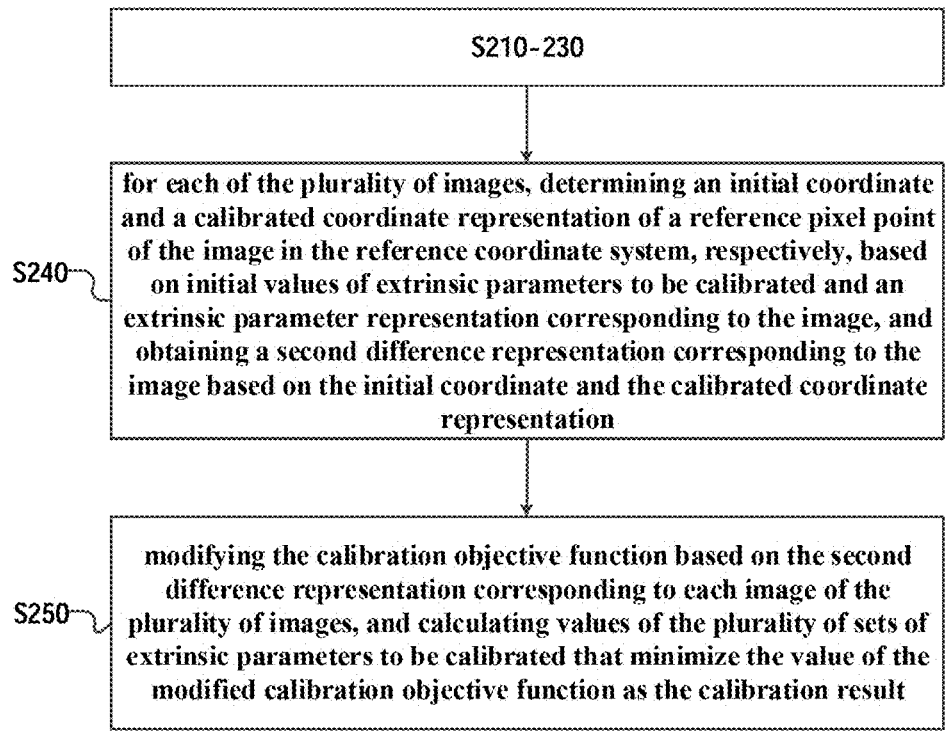
FIG. 5 shows another flowchart of the method for calibrating the extrinsic parameters of the camera provided by the embodiment of the present application.

Therefore, as shown in FIG. 5, the method 200 according to the embodiment of the present application may further include the following steps.

In step S240, for each image of the plurality of images, based on initial values of extrinsic parameters to be calibrated and an extrinsic parameter representation (unknown variables) corresponding to the image, an initial coordinate and a calibrated coordinate representation of a reference pixel point of the image in the reference coordinate system are respectively determined, and based on the initial coordinate and the calibrated coordinate representation, a second difference representation corresponding to the images is obtained.

For example, similar to the above, the initial values of the recorded extrinsic parameters to be calibrated when capturing each image (image i) are ($\theta_i'$, $\psi_i'$), and the coordinate of the reference pixel point of image i in the reference coordinate system (for example, the three-dimensional coordinate or the re-projection coordinate as mentioned above) can be obtained accordingly. In addition, the actual extrinsic parameters (i.e., the calibrated extrinsic parameters) are expressed as unknown variables ($\theta_i$, $\psi_i$) whose values are uncertain before the end of the iterative optimization process, and the coordinate representation of the reference point of image i in the reference coordinate system can be obtained accordingly.

In step S250, the calibration objective function is modified based on the second difference representation corresponding to each image of the plurality of images, and values of the plurality of sets of extrinsic parameters to be calibrated that minimize the value of the modified calibration objective function are calculated as the calibration result.

That is to say, on the basis of the calibration objective function shown in the previous formula (11) or (15), a regularization term associated with the pose similarity is added to calibrate the extrinsic parameters more accurately.

For example, based on the second difference representation corresponding to each image of the plurality of images and a corresponding adjustment factor, the adjustment term added to the sum of respective first difference representations can be determined, and the adjustment factor indicates an influence degree of the initial values of the extrinsic parameters to be calibrated corresponding to the image. Then the plurality of sets of extrinsic parameters to be calibrated can be calibrated by minimizing the sum of i) the sum of each first difference representation between the first coordinate representation and the second coordinate representation corresponding to each matched feature point pair of each matched image pair and ii) the adjustment term.

Optionally, each adjustment factor can be a weight applied to a corresponding second difference representation. As mentioned above, this further optimization is mainly to solve the problem that will exist when the number of matched images of an image is too small, so for each image among the plurality of images, the adjustment factor corresponding to the image is determined based on a first number of matched images of the image.

For example, if an image has enough matched images (such as image 1-image 4 in FIG. 3), the parameter adjustment in the iterative optimization process will not completely depend on only one matched image, so the optimization effect achieved based on the calibration objective function of formulas (11) or (15) can meet the requirements. On the other hand, if the number of matched images of the image is small (for example, image 5 in FIG. 3), the optimization effect achieved by the calibration objective function based on formulas (11) or (15) may not meet the requirements, so the adjustment item needs to be introduced.

Accordingly, when a first number of matched images of the image is larger than or equal to a threshold, the adjustment factor can be determined as a relatively small value, e.g., 0. Conversely, when the first number of matched images of the images is less than the threshold, the adjustment factor corresponding to the image can be determined as a relatively large value.

Optionally, the adjustment factor corresponding to the image can be further determined based on a second number of matched feature point pairs of the image and its matched images. For example, when the first number of matched images is determined, the larger the second number of matched feature point pairs, the larger the value of the adjustment factor, so that the influence degree of the initial values of the extrinsic parameters to be calibrated corresponding to the image in the iterative optimization process can be increased more.

Therefore, when the reference coordinate system as mentioned above is the world coordinate system, the following formula (24) is obtained by adding a pose constraint to the formula (12) by combining the regularization term (adjustment term) shown in the formula (22):

$$\underset{\theta_1 \psi_1 \ldots \theta_n \psi_n}{\text{argmin}} \sum_{i=1}^{n} \sum_{j=i+1}^{n} \sum_{k=1}^{m_{ij}}$$

$$\left| \text{unit}\left(R_{\theta_i \psi_i}^{-1} K^{-1} \begin{bmatrix} u_k^i \\ v_k^i \\ 1 \end{bmatrix}\right) - \text{unit}\left(R_{\theta_j \psi_j}^{-1} K^{-1} \begin{bmatrix} u_k^j \\ v_k^j \\ 1 \end{bmatrix}\right) \right| +$$

$$\sum_{i=1}^{n} w_i \left| \text{unit}\left(R_{\theta_i \psi_i}^{-1} K^{-1} \begin{bmatrix} u_c \\ v_c \\ 1 \end{bmatrix}\right) - \text{unit}\left(R_{\theta_i' \psi_i'}^{-1} K^{-1} \begin{bmatrix} u_c \\ v_c \\ 1 \end{bmatrix}\right) \right|.$$

[24]

In the above formula, $[u_c, v_c, 1]^T = [\text{width}/2, \text{height}/2, 1]^T$, $\theta_i'$ and $\psi_i'$ are initial values of the extrinsic parameters recorded when the i-th image is captured by the camera, which are fixed values and do not participate in optimization.

$w_i$ is the weight used for regularization term, that is, the adjustment factor corresponding to image i, the larger $w_i$ represents the greater influence of the initial values of extrinsic parameters, and the calculation method of the weight is as follows:

$$W_i = r_{inlier} n_{inlier}^{(i)} \left\lfloor \frac{n_{thr}}{n_{neibor}^{(i)}} \right\rfloor \quad (25)$$

In the above formula, $n_{inlier}^{(i)}$ is the number of all matched feature point pairs (inner point pairs) between the i-th image and all of its matched images, and $n_{neibor}^{(i)}$ is the number of matched images of the i-th image. The $r_{inlier}$ and $n_{thr}$ are preset parameters, $n_{thr}$ is a threshold, which means that only when the number of matched images of any image is less than $n_{thr}$, regularization item need to be introduced for that image, for example, $r_{inlier}=0.05 n_{thr}=3$.

Similarly, in the case of re-projection to the image coordinate system of an image, the following formula (26) is obtained by adding pose constraints to formula (16) with formula (23):

$$\underset{\theta_1\psi_1 \ldots \theta_n\psi_n}{\text{argmin}} \left( \sum_{i=1}^{n} \sum_{j=i+1}^{n} \sum_{k=1}^{m_{ij}} \left\| \begin{bmatrix} u_k^i \\ v_k^i \\ 1 \end{bmatrix} - \text{regular} \left( KR_{\theta_i\psi_i} R_{\theta_j\psi_j}^{-1} K^{-1} \begin{bmatrix} u_k^j \\ v_k^j \\ 1 \end{bmatrix} \right) \right\| + \sum_{i=1}^{n} w_i \left\| \begin{bmatrix} u_c \\ v_c \\ 1 \end{bmatrix} - \text{regular} \left( KR_{\theta_i\psi_i} R_{\theta_i'\psi_i'}^{-1} K^{-1} \begin{bmatrix} u_c \\ v_c \\ 1 \end{bmatrix} \right) \right\| \right) \quad (26)$$

The definition of each parameter in Formula (26) is the same as that in Formula (16) and Formula (24).

By the extrinsic parameter calibration method with the introduced regularization term described with reference to FIGS. 4-5, the format of the regularization term is basically the same as that of the objective function constructed based on the bundle adjustment method (which can be based on ray emission error or re-projection), so it can be directly constrained in the objective function constructed based on the bundle adjustment method, with simple calculation and convenient implementation in engineering. In addition, the weight of regularization term has practical significance, and it is convenient to determine the regularization weight, so it can be applied to different target scenarios. Therefore, by adding the regularization term to the objective function, the stitching effect of the algorithm on images captured for the low-texture regions can be improved, the matching error in the image matching stage can be compensated, the influence of error accumulation can be reduced, and the accuracy of extrinsic parameter calibration can be improved.

According to another aspect of present application, the invention also provides an image stitching method.

Figure 6:
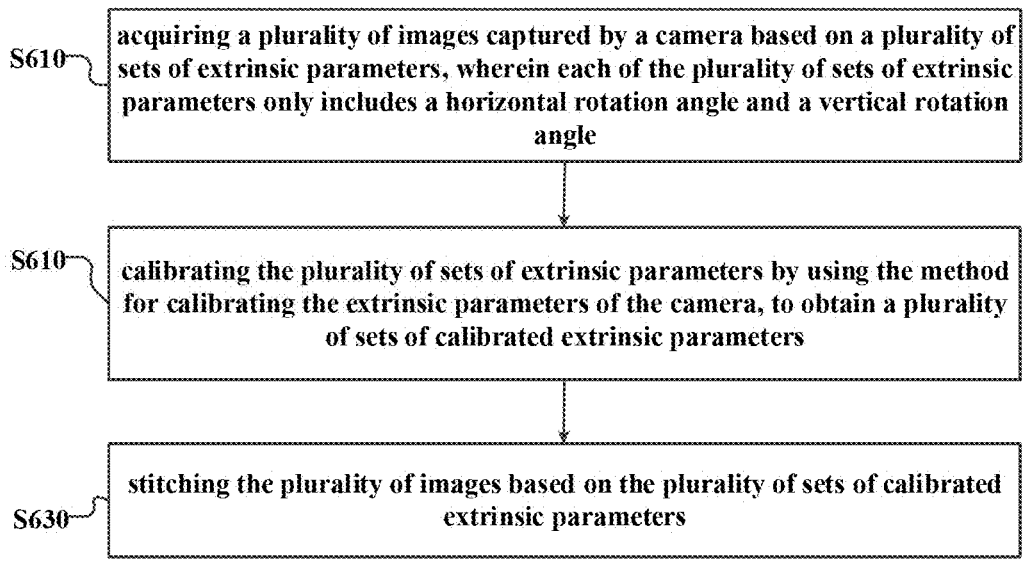
FIG. 6 shows a flowchart of the image stitching method provided by the embodiment of the present application.

As shown in FIG. 6, the image stitching method 600 may include the following steps.

In step S610, a plurality of images captured by the camera based on a plurality of sets of extrinsic parameters, each of which include a horizontal rotation angle and a vertical rotation angle, are acquired.

For example, the camera can rotate in the horizontal direction and the vertical direction to capture the plurality of images.

In step S620, the method for calibrating the camera extrinsic parameters described in the embodiment of the present application (for example, the method described with reference to FIGS. 2-5) is used to calibrate the plurality of sets of extrinsic parameters to obtain a plurality of sets of calibrated extrinsic parameters.

In step S630, the images are stitched based on the calibrated parameters.

Because the extrinsic parameter calibration method mentioned above is adopted in the image stitching method, the image stitching effect can be improved based on more accurate extrinsic parameters.

According to another aspect of present application, the invention also provides a device for calibrating extrinsic parameters of a camera.

Figure 7:
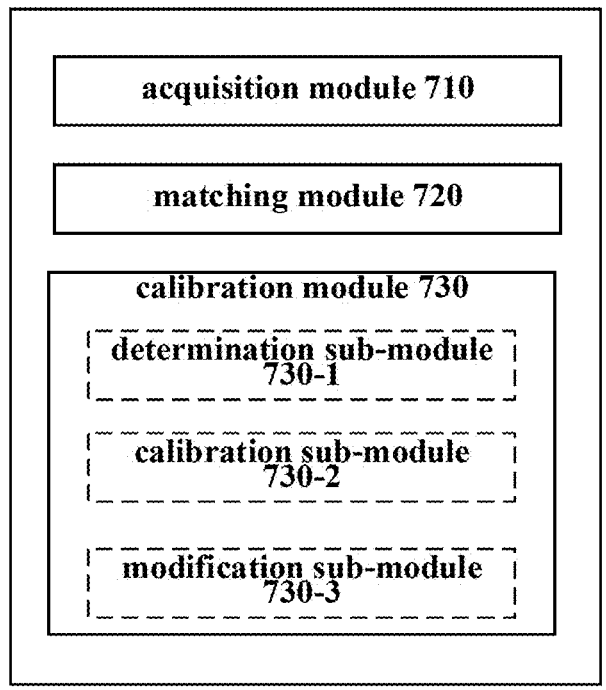
FIG. 7 shows a structural block diagram of an apparatus for calibrating extrinsic parameters of a camera according to an embodiment of the present application.

FIG. 7 shows a structural block diagram of an apparatus for calibrating extrinsic parameters of a camera according to an embodiment of the present application. The apparatus of FIG. 7 may be a terminal or a server shown in FIG. 1 or included therein.

As shown in FIG. 7, the apparatus may include an acquisition module 710, a matching module 720 and a calibration module 730.

The acquisition module 710 can be used to acquire a plurality of images captured by the camera based on a plurality of sets of extrinsic parameters to be calibrated, each of which include a horizontal rotation angle and a vertical rotation angle.

The matching module 720 can be used to obtain at least one matched image pair based on feature point matching among the plurality of images, wherein each matched image pair includes matched feature point pair with a quantity satisfying a threshold condition.

The calibration module 730 can be used to calibrate the sets of extrinsic parameters to be calibrated according to the first difference representation between the coordinate representations of each matched feature point of each matched image pair in the reference coordinate system.

Optionally, in order to speed up the optimization of the plurality of sets of extrinsic parameters to be calibrated, constrain the optimization direction and limit the range of the optimization result, the acquisition module 710 can also recorded values of the plurality of sets of extrinsic parameters to be calibrated when the camera captures the plurality of images, as initial values of the plurality of sets of extrinsic parameters to be calibrated, and provide them to the calibration module 730. In the calibration process, the calibration module 730 determines a calibration objective function by summing each first difference representation between coordinate representations of each matched feature point pair of each matched image pair in a reference coordinate system; and adjusts on the basis of the initial values of the plurality of sets of extrinsic parameters to be calibrated, and takes the adjusted values of the plurality of sets of extrinsic parameters to be calibrated that minimize a value of the calibration objective function as the calibration result.

Optionally, the matching module 720 can determine the matched image pair by any of the following ways: performing feature point matching on each image pair in the plurality of images, and determining at least one image pair whose number of matched feature point pairs meets a threshold condition as the at least one matched image pair; or determining pairwise adjacent images in the plurality of images to obtain candidate adjacent image pairs, and performing feature point matching on each adjacent image pair in the candidate adjacent image pairs, and determining at least one candidate adjacent image pair whose number of matched feature point pairs meets a threshold condition as the at least one matched image pair.

Optionally, the calibration module 730 comprises: a determination sub-module 730-1, configured to: for a first feature point and a second feature point in each matched feature point pair of each matched image pair, determine a first coordinate representation and a second coordinate representation of the first feature point and the second feature point in a reference coordinate system respectively, according to a coordinate value of the first feature point in a first image and a first extrinsic parameter representation corresponding to the first image, and a coordinate value of the second feature point in a second image and a second extrinsic parameter representation corresponding to the second image; and a calibration sub-module 730-2, configured to determine a calibration objective function by summing each first difference representation between the first coordinate representation and the second coordinate representation corresponding to each matched feature point pair of each matched image pair, and calculate values of the plurality of sets of parameters to be calibrated that minimize a value of the calibration objective function as a calibration result.

Optionally, the calibration sub-module 730 further comprises a modification sub-module 730-3. The determination sub-module 730-1 is further configured to: for each of the plurality of images, determine an initial coordinate and a calibrated coordinate representation of a reference pixel point of the image in the reference coordinate system, respectively, based on initial values of extrinsic parameters to be calibrated and an extrinsic parameter representation corresponding to the image, and determine a second difference representation corresponding to the image based on the initial coordinate and the calibrated coordinate representation; and the modification sub-module 730-3 is configured to: modifying the calibration objective function based on the second difference representation corresponding to each image of the plurality of images, and the calibration sub-module 730-2 is further configured to calculate values of the plurality of sets of extrinsic parameters to be calibrated that minimize the value of the modified calibration objective function, as the calibration result.

For example, the calibration sub-module 730-3 can determine an adjustment term for the calibration objective function based on the second difference representation corresponding to each image and an adjustment factor corresponding thereto, wherein the adjustment factor indicates an influence degree of initial values of extrinsic parameters to be calibrated corresponding to the image. For each of a plurality of images, an adjustment factor corresponding to the image is determined based on a first number of matched images of the image. For each of a plurality of images, when the first number is greater than or equal to a threshold, a value of the adjustment factor is 0, and when the first number is less than the threshold, the value of the adjustment factor is further determine based on a second number of matched feature point pairs between the image and its matched images.

For more details of the operation of the above modules and sub-modules, please refer to the contents described in FIGS. 2-5, so the description will not be repeated here.

Figure 8:
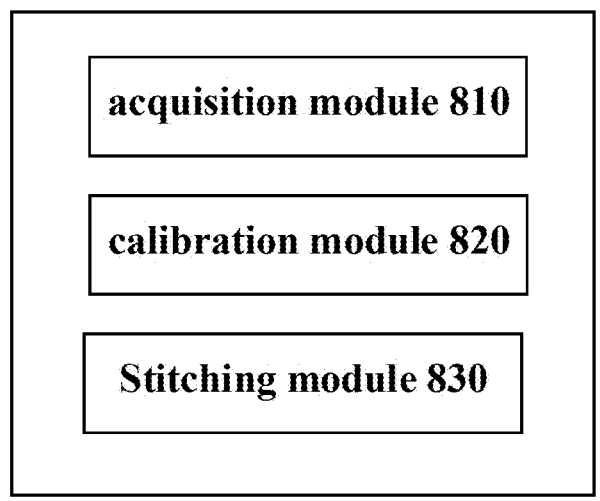
FIG. 8 shows a structural block diagram of an image stitching apparatus 1000 according to an embodiment of the present application.

FIG. 8 shows a structural block diagram of an image stitching apparatus 800 according to an embodiment of the present application. The apparatus 800 of FIG. 8 may be a terminal or a server shown in FIG. 1 or included therein.

As shown in FIG. 8, the apparatus 800 may include an acquisition module 88, a calibration module 820 and a stitching module 830.

The acquisition module 88 can be used to acquire a plurality of images captured by the camera based on a plurality of sets of extrinsic parameters, each of which include a horizontal rotation angle and a vertical rotation angle.

Figure 9:
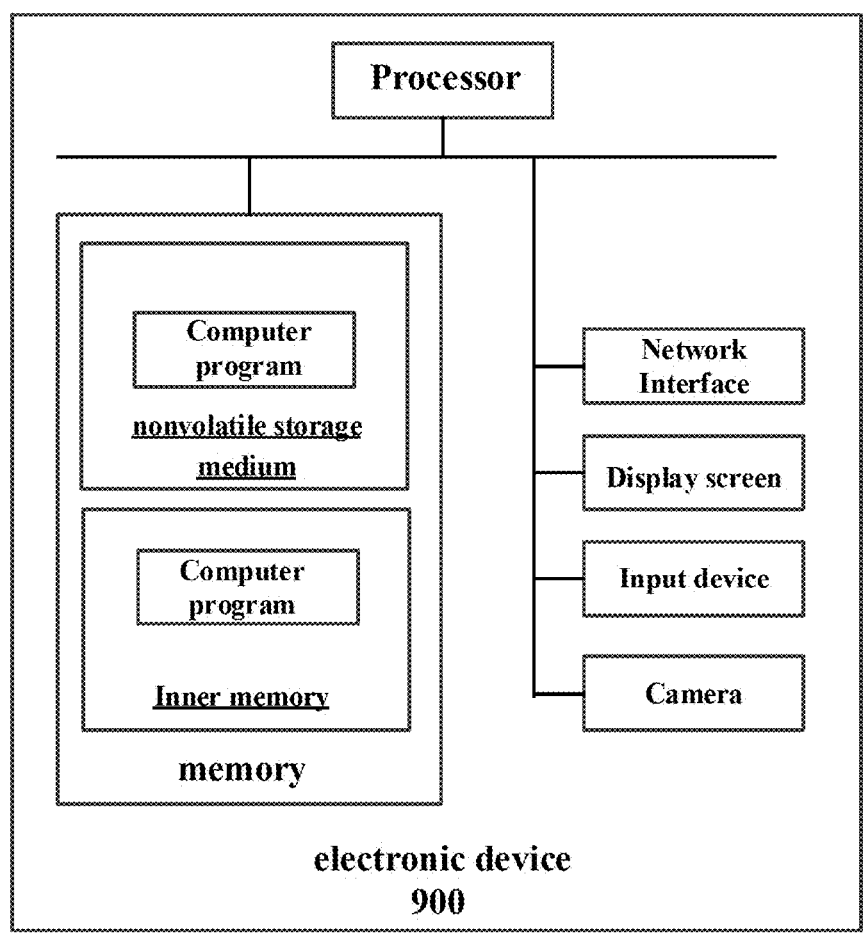
FIG. 9 shows a schematic block diagram of an electronic device according to an embodiment of the present application.

The calibration module 820 can be an apparatus for calibrating the camera extrinsic parameters as shown in FIG. 9, and is used for calibrating the plurality of sets of extrinsic parameters to obtain a plurality of sets of calibrated extrinsic parameters.

The stitching module 830 can be used to stitch the plurality of images based on the plurality of sets of calibrated extrinsic parameters.

For more information about each module, please refer to the content described above, and the description will not be repeated here.

In addition, although the above modules and sub-modules are shown by way of example in FIGS. 9 and 8, it should be understood that the apparatus 900 and the apparatus 800 can be divided into more or less modules and sub-modules according to different functions, or each module and sub-modules can be further divided into more or less sub-modules. In some example embodiments, a module or its sub-modules can be implemented by electronic hardware (e.g., general-purpose processor, DSP, ASIC, FPGA or other programmable logic devices, discrete gate or transistor logic, discrete hardware components, etc.), computer software (e.g., which can be stored in random access memory (RAM), flash memory, read-only memory (ROM), erasable programmable ROM (EPROM), etc.) or a combination of the two.

FIG. 9 shows a schematic block diagram of an electronic device according to an embodiment of the present application. The electronic device may be a server or a terminal as shown in FIG. 1.

As shown in FIG. 9, an electronic device 900 includes one or more processors, one or more memories, a network interface, an input device and a display screen connected through a system bus. The memory comprises a nonvolatile storage medium and an intrinsic memory. The nonvolatile storage medium stores an operating system and computer executable programs, which, when executed by the processor, can enable the processor to realize various operations of the method for calibrating the camera extrinsic parameters and the image stitching method as described above. The intrinsic memory can also store computer executable programs, which, when executed by the processor, can cause the processor to perform various operations described in the steps of the method for calibrating the camera extrinsic parameters and the image stitching method.

The processor can be an integrated circuit chip with signal processing capability. The processor can be a general processor, a digital signal processor (DSP), an application specific integrated circuit (ASIC), an off-the-shelf programmable gate array (FPGA) or other programmable logic devices, discrete gate or transistor logic devices, and discrete hardware components, for implementing or executing the methods, steps and logic blocks disclosed in the embodiments of the present application. The general processor can be a microprocessor or any conventional processor, and it can be X84 architecture or ARM architecture.

The nonvolatile storage medium may be read-only memory (ROM), programmable read-only memory (PROM), erasable programmable read-only memory (EPROM), electrically erasable programmable read-only memory (EEPROM) or flash memory. It should be noted that the memories of the methods described in present application are intended to include, but are not limited to, these and any other suitable types of memories.

The display screen of the electronic equipment can be a liquid crystal display screen or an electronic ink display screen, and the input device of the electronic equipment can be a touch layer covered on the display screen, a button, a trackball or a touch pad arranged on the terminal shell, an external keyboard, a touch pad or a mouse.

The electronic device can be a terminal or a server. Among them, the terminal can include but not limited to: smart phone, tablet computer, notebook computer, desktop computer, smart TV, etc. Various applications (APPs) can run in the terminal, such as multimedia playing client, social client, browser client, information flow client, education client, and so on. The server can be the server described with reference to FIG. 1, that is, it can be an independent physical server, a server cluster or distributed system composed of multiple physical servers, and a cloud server that provides basic cloud computing services such as cloud services, cloud databases, cloud computing, cloud functions, cloud storage, network services, cloud communication, middleware services, domain name services, security services, CDN, and big data and artificial intelligence platforms.

According to another aspect of present application, a computer-readable storage medium is also provided, on which computer programs are stored, and when the computer programs are executed by a processor, the processor is caused to perform the steps of the method for calibrating camera extrinsic parameters and the image stitching method as described above.

According to another aspect of the present application, there is also provided a computer program product, including computer programs, which, when executed by a processor, realizes the steps of method for calibrating camera extrinsic parameters and the image stitching method as described above.

Reference to an element in the singular is not intended to mean "one and only one" unless specifically so stated, but rather "one or more." Similarly, reference to an element in the plural is not intended to mean "more than one" unless specifically so stated or being contradictory with the description elsewhere, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.

It should be noted that the flowcharts and block diagrams in the attached drawings illustrate the possible architectures, functions and operations of the methods and apparatuses according to various embodiments of the present application. In this regard, each block in the flowchart or block diagram may represent a module, a program segment, or a part of code, which contains at least one executable instruction for implementing a specified logical function. It should also be noted that in some alternative implementations, the functions noted in the blocks may occur in a different order than those noted in the drawings. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be implemented by a dedicated hardware-based system that performs specified functions or operations, or by a combination of dedicated hardware and computer instructions.

The example embodiments of the present application described in detail above are only illustrative and not restrictive. It should be understood by those skilled in the art that various modifications and combinations can be made to these embodiments or their features without departing from the principles and spirit of present application, and such modifications should fall within the scope of present application.

What claimed is:

1. A method for calibrating extrinsic parameters of a camera, comprising:
   acquiring a plurality of images captured by the camera based on a plurality of sets of extrinsic parameters to be calibrated, wherein each of the plurality of sets of extrinsic parameters to be calibrated include a horizontal rotation angle and a vertical rotation angle of Euler angles instead of all Euler angles;
   obtaining at least one matched image pair based on feature point matching among the plurality of images, wherein each matched image pair comprises matched feature point pairs with a quantity satisfying a threshold condition; and
   calibrating the plurality of sets of extrinsic parameters to be calibrated according to a first difference representation between coordinate representations of each matched feature point pair of each matched image pair in a reference coordinate system,
   wherein, the camera comprises a single camera and the camera is configured to rotate in at least one of a horizontal direction or a vertical direction when capturing images,
   wherein obtaining at least one matched image pair based on feature point matching among the plurality of images comprises:
   performing feature point matching on each image pair in the plurality of images, and determining at least one image pair whose number of matched feature point pairs meets the threshold condition as the at least one matched image pair; or
   determining pairwise adjacent images in the plurality of images to obtain candidate adjacent image pairs, and performing feature point matching on each adjacent image pair in the candidate adjacent image pairs, and determining at least one candidate adjacent image pair whose number of matched feature point pairs meets the threshold condition as the at least one matched image pair.

2. The method according to claim 1, further comprising: acquiring recorded values of the plurality of sets of extrinsic parameters to be calibrated when the camera captures the plurality of images, as initial values of the plurality of sets of extrinsic parameters to be calibrated, wherein, calibrating the plurality of sets of extrinsic parameters to be calibrated according to a first difference representation between coordinate representations of each matched feature point pair of each matched image pair in a reference coordinate system, comprises:
determining a calibration objective function by summing each first difference representation between coordinate representations of each matched feature point pair of each matched image pair in a reference coordinate system; and
adjusting on the basis of the initial values of the plurality of sets of extrinsic parameters to be calibrated, and taking the adjusted values of the plurality of sets of extrinsic parameters to be calibrated that minimize a value of the calibration objective function as a calibration result.

3. The method according to claim 1, wherein calibrating the plurality of sets of extrinsic parameters to be calibrated according to a first difference representation between coordinate representations of each matched feature point pair of each matched image pair in a reference coordinate system, comprises:
for a first feature point and a second feature point in each matched feature point pair of each matched image pair, determining a first coordinate representation and a second coordinate representation of the first feature point and the second feature point in a reference coordinate system respectively, according to a coordinate value of the first feature point in a first image and a first extrinsic parameter representation corresponding to the first image, and a coordinate value of the second feature point in a second image and a second extrinsic parameter representation corresponding to the second image; and
determining a calibration objective function by summing each first difference representation between the first coordinate representation and the second coordinate representation corresponding to each matched feature point pair of each matched image pair, and calculating values of the plurality of sets of parameters to be calibrated that minimize a value of the calibration objective function as a calibration result.

4. The method according to claim 3, further comprising:
for each of the plurality of images, determining an initial coordinate and a calibrated coordinate representation of a reference pixel point of the image in the reference coordinate system, respectively, based on initial values of extrinsic parameters to be calibrated and an extrinsic parameter representation corresponding to the image, and obtaining a second difference representation corresponding to the image based on the initial coordinate and the calibrated coordinate representation; and
modifying the calibration objective function based on the second difference representation corresponding to each image of the plurality of images, and calculating values of the plurality of sets of extrinsic parameters to be calibrated that minimize the value of the modified calibration objective function as the calibration result.

5. The method according to claim 4, wherein modifying the calibration objective function based on the second difference representation corresponding to each image comprises:
determining an adjustment term for the calibration objective function based on the second difference representation corresponding to each image and an adjustment factor corresponding thereto, wherein the adjustment factor indicates an influence degree of initial values of extrinsic parameters to be calibrated corresponding to the image.

6. The method according to claim 5, wherein, for each image of the plurality of images, the adjustment factor corresponding to the image is determined based on a first number of matched images of the image.

7. The method according to claim 6, wherein for each image of the plurality of images, when the first number is greater than or equal to a threshold, a value of the adjustment factor is 0, and when the first number is less than the threshold, the value of the adjustment factor is further determine based on a second number of matched feature point pairs between the image and its matched images.

8. The method according to claim 3, wherein for each matched feature point pair of each matched image pair:
determining the first coordinate representation of the first feature point in the matched feature point pair in the reference coordinate system according to the coordinate value of the first feature point in the first image and the first extrinsic parameter representation corresponding to the first image, and
determining a second coordinate representation of the second feature point in the matched feature point pair in the reference coordinate system according to the coordinate value of the second feature point in the second image and the second extrinsic parameter representation corresponding to the second image.

9. The method according to claim 3, wherein an image coordinate system corresponding to one image of the plurality of images is used as the reference coordinate system,
for each matched feature point pair of each matched image pair:
re-projecting the first feature point in the matched feature point pair into the reference coordinate system according to the coordinate value of the first feature point in the first image, the first extrinsic parameter representation corresponding to the first image and the extrinsic parameter representation corresponding to the one image, to determine the first coordinate representation of the first feature point in the reference coordinate system; and
re-projecting the second feature point in the matched feature point pair into the reference coordinate system according to the coordinate value of the second feature point in the second image, the second extrinsic parameter representation corresponding to the in second image and the extrinsic parameter representation corresponding to the one image, to determine the second coordinate representation of the second feature point in the reference coordinate system.

10. The method according to claim 3, wherein for each matched feature point pair of each matched image pair:
determining an image coordinate system corresponding to the first image in the matched image pair as the reference coordinate system,
determining the first coordinate representation of the first feature point in the reference coordinate system based on the coordinate value of the first feature point in the matched feature point pair in the first image; and
re-projecting the second feature point in the matched feature point pair into the reference coordinate system according to the coordinate value of the second feature point in the second image, the second extrinsic parameter representation corresponding to the second image and the extrinsic parameter representation corresponding to the first image, so as to determine the second coordinate representation of the second feature point in the reference coordinate system.

11. An electronic device comprising:
a processor, and
a memory having stored there on computer programs which, when executed by the processor, cause the processor to perform the method according to claim 1.

12. A non-transitory computer-readable storage medium having stored thereon computer programs which, when executed by the processor, cause the processor to perform the method according to claim 1.

13. An image stitching method, comprising:
acquiring a plurality of images captured by a single camera based on a plurality of sets of extrinsic parameters, wherein each of the plurality of sets of extrinsic parameters include a horizontal rotation angle and a vertical rotation angle of Euler angles instead of all Euler angles;
calibrating the plurality of sets of extrinsic parameters by using the method for calibrating the extrinsic parameters of the camera according to claim 1, to obtain a plurality of sets of calibrated extrinsic parameters; and
stitching the plurality of images based on the plurality of sets of calibrated extrinsic parameters.

14. An apparatus for calibrating extrinsic parameters of a camera, comprising:
an acquisition module for acquiring a plurality of images captured by the camera based on a plurality of sets of extrinsic parameters to be calibrated, wherein each of the plurality of sets of extrinsic parameters to be calibrated include a horizontal rotation angle and a vertical rotation angle of Euler angles instead of all Euler angles;
a matching module for obtaining at least one matched image pair based on feature point matching among the plurality of images, wherein each matched image pair comprises matched feature point pairs with a quantity satisfying a threshold condition; and
a calibration module for calibrating the plurality of sets of extrinsic parameters to be calibrated according to a first difference representation between coordinate representations of each matched feature point pair of each matched image pair in a reference coordinate system,
wherein, the camera comprises a single camera and the camera is configured to rotate in at least one of a horizontal direction or a vertical direction when capturing images,
wherein obtaining at least one matched image pair based on feature point matching among the plurality of images, the matching module is configured to:
perform feature point matching on each image pair in the plurality of images, and determine at least one image pair whose number of matched feature point pairs meets the threshold condition as the at least one matched image pair; or
determine pairwise adjacent images in the plurality of images to obtain candidate adjacent image pairs, and perform feature point matching on each adjacent image pair in the candidate adjacent image pairs, and determining at least one candidate adjacent image pair whose number of matched feature point pairs meets the threshold condition as the at least one matched image pair.

15. The apparatus according to claim 14, wherein the calibration module comprises:
a determination sub-module, configured to: for a first feature point and a second feature point in each matched feature point pair of each matched image pair, determine a first coordinate representation and a second coordinate representation of the first feature point and the second feature point in a reference coordinate system respectively, according to a coordinate value of the first feature point in a first image and a first extrinsic parameter representation corresponding to the first image, and a coordinate value of the second feature point in a second image and a second extrinsic parameter representation corresponding to the second image; and
a calibration sub-module, configured to determine a calibration objective function by summing each first difference representation between the first coordinate representation and the second coordinate representation corresponding to each matched feature point pair of each matched image pair, and calculate values of the plurality of sets of parameters to be calibrated that minimize a value of the calibration objective function as a calibration result.

16. The apparatus of claim 15, wherein, the calibration module further comprises a modification sub-module, wherein:
the determination sub-module is further configured to: for each of the plurality of images, determine an initial coordinate and a calibrated coordinate representation of a reference pixel point of the image in the reference coordinate system, respectively, based on initial values of extrinsic parameters to be calibrated and an extrinsic parameter representation corresponding to the image, and determine a second difference representation corresponding to the image based on the initial coordinate and the calibrated coordinate representation; and
the modification sub-module is configured to: modifying the calibration objective function based on the second difference representation corresponding to each image of the plurality of images, and
the calibration sub-module is further configured to calculate values of the plurality of sets of extrinsic parameters to be calibrated that minimize the value of the modified calibration objective function, as the calibration result.

17. The apparatus according to claim 16, wherein the modification sub-module modifies the calibration objective function, the modification sub-module is configured to:
determine an adjustment term for the calibration objective function based on the second difference representation corresponding to each image and an adjustment factor corresponding thereto, wherein the adjustment factor indicates an influence degree of initial values of extrinsic parameters to be calibrated corresponding to the image.

18. An image stitching apparatus, comprising:
an acquisition module, for acquiring a plurality of images captured by a single camera based on a plurality of sets of extrinsic parameters, wherein each of the plurality of sets of extrinsic parameters include a horizontal rotation angle and a vertical rotation angle of Euler angles instead of all Euler angles;
the apparatus according to claim 14, for calibrating the plurality of sets of extrinsic parameters to obtain a plurality of sets of calibrated extrinsic parameters; and
a stitching module, for stitching the plurality of images based on the plurality of sets of calibrated extrinsic parameters.

* * * * *